Figure 1:
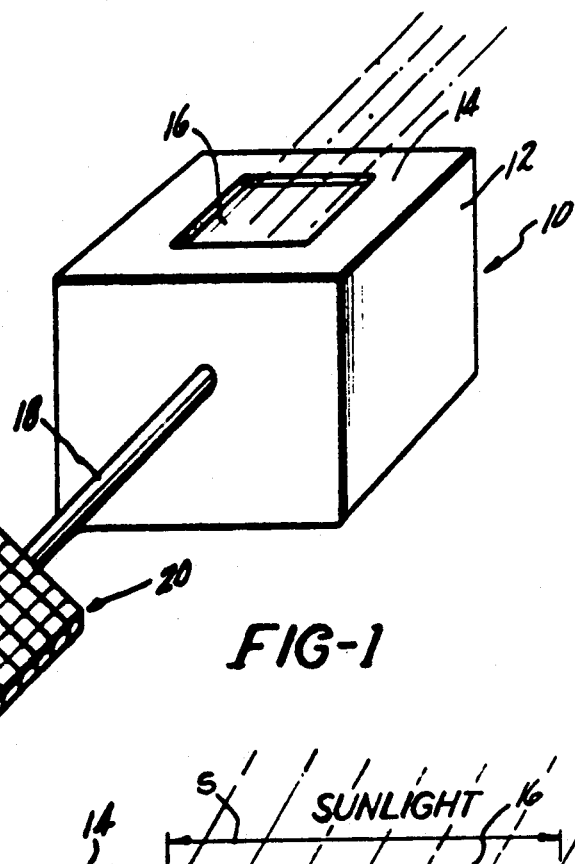

United States Patent [19]

Glynn

[11] 4,079,249
[45] Mar. 14, 1978

[54] SOLAR ENERGY OPERATED MOTOR APPARATUS

[76] Inventor: Kenneth P. Glynn, 617 Boulevard, Westfield, N.J. 07090

[21] Appl. No.: 766,763

[22] Filed: Feb. 8, 1977

[51] Int. Cl.² .................................................. F03C 5/00
[52] U.S. Cl. ................................ 250/203 R; 60/531; 60/641
[58] Field of Search ............. 250/203 R; 126/270; 60/531, 641

[56] References Cited
U.S. PATENT DOCUMENTS 2,999,943  9/1961  Geer ........................................ 250/215

Primary Examiner—James B. Mullins
Attorney, Agent, or Firm—Kenneth P. Glynn

[57] ABSTRACT

A motor apparatus is described for orientating solar responsive devices. The motor apparatus is solar energy operated and comprises a plurality of containers connected in closed systems having fluid therein, support means for the containers including rotatable parts, and a solar window-containing component which permits solar energy to strike surfaces of the containers so as to change the distribution of fluid in the systems to cause the rotatable parts, and thus an attached solar responsive device, to rotate, e.g., in an arc so as to follow the sun.

9 Claims, 2 Drawing Figures

SOLAR ENERGY OPERATED MOTOR APPARATUS

The present invention relates to a motor apparatus which is used to move or rotate an object and is especially used to orientate solar responsive devices such as solar recording and measurement devices and solar energy converters, e.g., solar cells, parabolic collectors, etc.

Many devices have recently been developed which measure and record, e.g., by photographic techniques, various solar phenomena of scientific interest. Many other devices have recently been developed which are of a more practical interest and which convert solar energy into other forms of energy such as thermal, electrical or chemical energy. All of these devices function optimally when facing the sun so as to receive as much direct solar energy as possible. Since the sun, of course, shifts at a relatively rapid daily rate from east to west and also at a much less rapid seasonal rate from north to south and south to north, considerable effort has been made to produce an apparatus which will orientate solar responsive devices so as to follow the sun. Unfortunately, the usual sun-seeking apparatus of today is a complicated piece of electronic equipment having mechanisms which may require electronic amplification and/or electrical drive means, requiring an outside power source. Such apparatus are very costly and are not readily adaptable to such solar responsive devices as home or industrial solar collectors, solar power cells, solar research equipment, small industrial solar responsive equipment, etc.

The present invention is directed to a motor apparatus which may be used to move or rotate objects and is advantageously used for orientating solar responsive devices. The apparatus relies upon solar energy for its operation and avoids the need for electronic equipment and auxiliary power sources.

U.S. Pat. No. 2,999,943 to C. W. Geer describes a crude self-orienting heliotropic device which, like the present invention, relies upon solar energy for its operation and avoids the necessity of electronic equipment and auxiliary power sources. That patent describes a device which includes a temperature differential sensing mechanism having containers which are tubularly connected to form a closed system containing a predetermined amount of liquid which has a low boiling point; a shield supported adjacent each container and movable in concert therewith, the shields being proportioned and positioned so that when the containers and a source of radiant energy are in a predetermined relation, the containers are equally insulated, and when not in that predetermined relation, the shields allow a greater amount of radiant energy to strike the containers most distant from the source and a lesser amount to strike the containers less distant from the source thereby producing a temperature differential between the containers; and support means rotatably connected to the mechanism whereby the temperature differential between the containers results in a transfer of liquid to the cooler container thus causing a change in the status balance of the mechanism and rotation thereof with respect to the support until the temperature differential is eliminated.

While the invention described in that patent overcomes the above-mentioned disadvantages of the more sophisticated solar orientation apparatus, it has significant shortcomings of its own. Firstly, the patent teachings require that the shields for shielding sunlight be located adjacent to each container. Such shields necessarily must be substantially taller than the containers to assure that the sunlight does not hit the entire top surface of the container closer to the sun, when the sun is in the mid-morning or the mid-afternoon position, to avoid premature or late equilibrizing of the mechanism. Since the shield of the container closer to the sun must thus be effective when the more distant container is tilted upward due to solar exposure and liquid loss, the shield must especially function when it is tilted biased towards parallelism with the sun's rays. Thus the shields must be excessively taller than the containers. Such tall shields will shield the eastern container in the morning when the eastern container is tilted downward and the western container is tilted upward, and vice versa in the afternoon. But since the mechanism equilibrizes during the night, the sun will have to rise high before solar energy will pass over the eastern container shield to effectively strike the western container. There is a trade-off between having a mechanism that will function from relatively early in the morning to late afternoon and one that will avoid premature and prolonged equilibrizing of the mechanism during midday. Regardless of which objective is given preference, a mechanism that will function for most of the sunlit day and yet will function with accuracy during peak sun hours cannot be achieved with the invention described in U.S. Pat. No. 2,999,943.

Secondly, in the invention described in that patent, solar energy strikes the entire top of at least one half of the containers throughout the entire period during which the mechanism functions. This may result in overheating or in an excessively rapid heating of the totally exposed container and thus overreaction of the mechanism. This causes a rotation which may be too fast in the morning and too slow in the afternoon preventing a uniformly gradual rotation of the mechanism and a concomitant lack of proper orientation of an attached solar responsive device.

The present invention overcomes these disadvantages of the prior art by avoiding the need for excessively tall shields adjacent each container and by avoiding continuous complete exposure of the containers on one side or the other of the prior art mechanism. The present invention, further, permits the use of an array of containers arranged so as to assure a more uniformly gradual rotation and orientating of solar responsive devices toward the sun.

The apparatus of the present invention comprises a plurality of containers, connecting conduits, a fluid in the containers, support means for the containers, and a solar window-containing component. The plurality of containers have solar exposable surfaces and are evenly divided into a first group and a second group, each group having at least one container, each group having preferably more than one container. A conduit connects at least one container of the first group with at least one container of the second group to form a closed system. A predetermined amount of fluid is employed in the closed system and is at least partially in the liquid phase. The support means for the containers have a rotational axis upon which at least part of the support means rotates in response to a shift in the amount of the fluid in the system which is distributed between the first and second group of containers forming the system. The solar window-containing component comprises non-vertical solar shielding surfaces which are at least partially located above the plurality of containers. The solar shielding surfaces have an open area forming a solar window above the plurality of containers. The solar window has an effective cross-sectional dimension perpendicular to the rotational axis of the support means which is less than the greatest distance between the outer edges of the solar exposable surfaces of the plurality of containers when measured perpendicular to the rotational axis of the support means, and the solar window is located substantially above the first and second groups of containers, preferably evenly so located.

The apparatus of the present invention is employed so that solar energy is permitted to enter the solar window and to strike solar exposable surfaces of the containers during operation. The axis of rotation of the support means is generally arranged in a north-south position so that the cross-sectional dimension of the solar window perpendicular to that axis is placed in an east-west position. This divides the two groups of containers into an eastern group and a western group. As the sun rises in the morning solar energy strikes solar exposable surfaces of the containers in the western group of containers and this shifts the distribution of the fluid in the system to cause rotation of at least part of the support means. This rotating portion is connected to an attachment which is desired to be moved, e.g., a solar responsive device, which rotates therewith, either in harmony therewith or in some gear ratio appropriate to move an attachment as desired, e.g., to cause a solar responsive device to follow the sun. As the sun approaches midday the solar energy entering the solar window moves so as to strike parts of the solar exposable surfaces of both groups of containers and to not strike other parts of those surfaces of containers in both groups, striking more of the western containers before sun peak and more of the eastern containers after sun peak. Because the solar window-containing component has non-vertical shielding surfaces which are at least partially above the plurality of containers, there is no need for shields of excessive height adjacent the containers, and the solar energy enters the solar window and operates the apparatus much earlier in the day than it would given a set of containers having adjacent shields as in the prior art. Additionally, since the solar window has an effective cross-sectional dimension perpendicular to the axis of rotation which is less than greatest distance between the outer edges of the solar exposable surfaces of the plurality of containers, the solar energy does not continuously strike the entire surface of at least one half of the containers during the entire day. Unlike the prior art mechanism which permits the entire western container top surface to be exposed to solar energy all morning and the eastern container top surface to be exposed all afternoon, the present invention operates in the morning on both the exposure to and the shielding from solar energy of both eastern and western containers, as it does in the afternoon. This establishes a greater sensitivity of the apparatus to solar positional changes and results in a more uniform rotation and more accurate solar orientation of the attached solar responsive device.

In one preferred embodiment of the present invention, the above-mentioned fluid in the system is in both the liquid and the gaseous phases in at least one of the containers connected by a conduit. The conduit is open for gaseous transport of the fluid between at least one container of the first group and at least one container of the second group, and the amount of fluid in the system which is distributed between the first and second groups of containers forming the system shifts by boiling of the fluid from one group to the other in response to exposure of the solar exposable surfaces to solar energy.

In another preferred embodiment of the present invention, the above-mentioned fluid in the system is in both the liquid and the gaseous phases in all containers connected by conduit, the conduit or conduits connecting the first and second group of containers is filled with the fluid in the liquid phase, and the amount of fluid in the system which is distributed between the first and second groups of containers forming the system shifts by changes in vapor pressure in the container in response to exposure of the solar exposable surfaces to solar energy.

The container employed in the present invention may be any container which is capable of being sealed, which is compatible with the fluid employed and which has solar exposable surfaces, i.e., surfaces through which solar energy may affect the level of molecular activity of the fluid, e.g., changing vapor pressure, boiling the fluid, etc., by either radiation or thermal conduction. Such containers may be made of glass, synthetically fabricated material, metal or the like and preferably the containers are made of material having a high thermal conductivity. The solar exposable surfaces may optionally be painted black to enhance solar energy absorption. The conduits employed to connect the containers may be made of similar or different material and they may be solar shielding material, although materials similar to those used for the containers are preferred, and they may be made of flexible or inflexible material such as plastic or rubber hosing, metal tubing, glass tubing, etc.

While the plurality of containers is evenly divided into two groups, each group need only have one container, although more than one container for each group is preferred. When each group contains more than one container, the containers may be contiguous or may be spaced away from each other and may be connected to each other or connected to containers of the other group, or both.

In one preferred embodiment, each of the two groups have a plurality of containers positioned in a single plane and the containers are preferably arranged in a series in a direction perpendicular to the rotational axis of the support means. Advantageously, the containers in each group being the first to N-th containers when counted from left to right where N is the number of containers per group, the first container of one group is connected by a conduit to the first container in the other group and each of the remaining containers of one group are similarly connected by a conduit to the corresponding container in the other group to form a total of N closed systems. In such an arrangement the containers are particularly sensitive to solar positional changes, as illustrated in the discussion of the drawings below.

The fluid employed in the system of the apparatus of the present invention may be any fluid which will function in the apparatus, as described. Such fluids include organic materials such as methylene chloride, methyl ethyl ketone, lower alcohols such as ethanol, butanol, etc., and fluorinated hydrocarbons such as the freons. The scope of fluids which may be employed is significantly broadened by the use of a pane of magnifying glass, e.g., a one dimensional magnifier, which will concentrate the solar energy passing through the solar window to permit greater solar and thermal energy differences between sunlit and shaded portions of the solar exposable surfaces of the plurality of containers employed in the motor apparatus of the present invention. Thus, any fluid which will respond to such thermal energy differences may be used.

Although the motor apparatus of the present invention has been described for orientating solar responsive devices, it is emphasized that the apparatus may be used to drive, move or rotate any object. Thus, the apparatus could be used to open and close irrigation systems, e.g., in desert areas, and would only operate on sunny days, leaving nature alone to irrigate on rainy days. The apparatus could, in such situations, negate the necessity of laying expensive power systems where electrical power is otherwise unavailable. The apparatus could, for example, be used as a winding motor for devices having wind-up motivation. Many other uses may be envisioned without exceeding the scope of the present invention.

Figure 2:
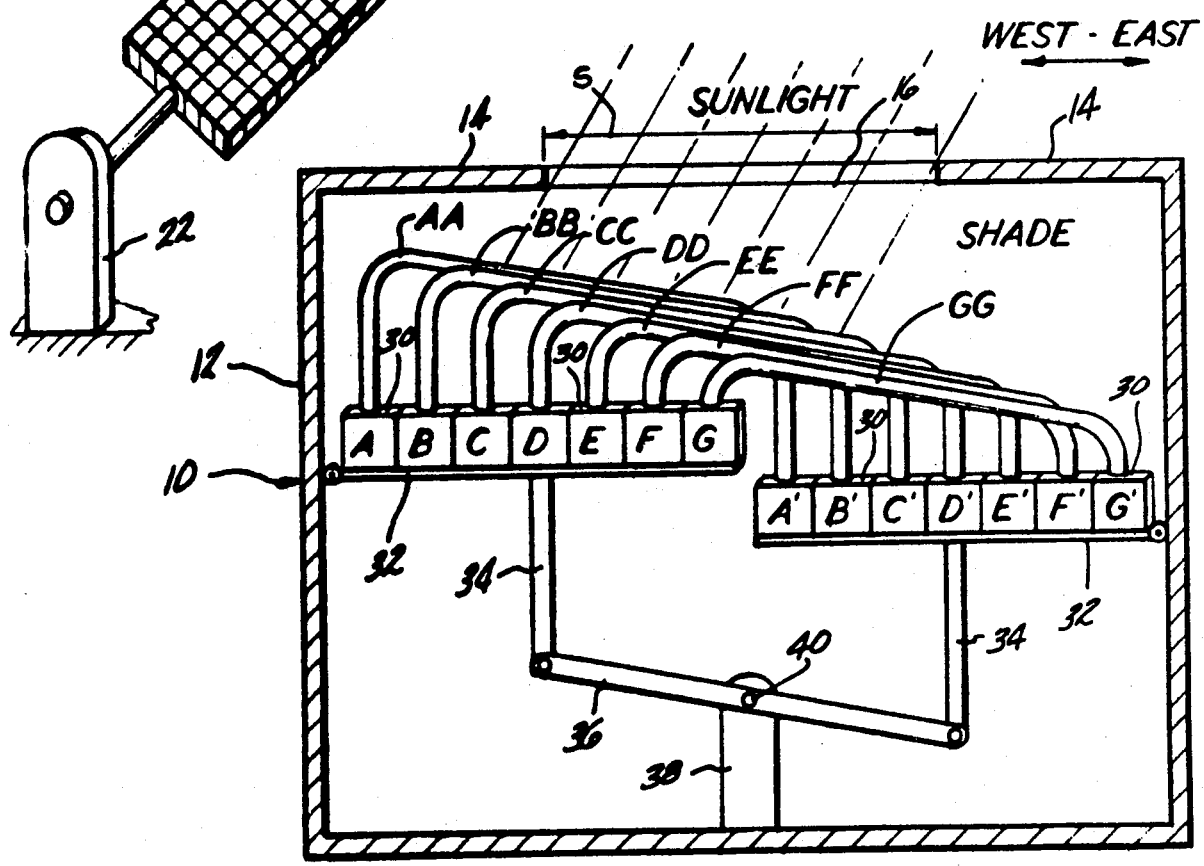

The motor apparatus of the present invention may be further understood by reference to the drawings, described only for illustrative purposes:

FIG. 1 shows an embodiment of the motor apparatus of the present invention attached to a solar cell panel; and FIG. 2 shows a cut away view of an embodiment of the motor apparatus of the present invention.

FIG. 1 illustrates an embodiment of the present invention wherein the motor apparatus designated generally as 10 is shown attached to a solar cell 20. Motor apparatus 10 has as its frame a solar window-containing component 12 having non-vertical solar shielding surfaces 14 and solar window 16. Sunlight passes into solar window 16 to motivate apparatus 10 as more fully described in conjunction with FIG. 2 below. The motivated aspects of the apparatus are connected to axle 18 which is connected to solar cell 20 and is rotatably mounted in mount 22. In the operation of the apparatus, as the sun shifts from east to west, solar cell 20 rotates so that the surface of the solar cell is maintained substantially perpendicular to the rays of the sun. By being orientated in this manner, solar cell 20 continuously obtains an optimum amount of solar energy and its productivity is concomitantly enhanced.

FIG. 2 shows a cut away view of motor apparatus 10 so as to expose the mechanism thereof. Apparatus 10 comprises solar window-containing component 12 having non-vertical solar shielding surfaces 14 and solar window 16. Within the apparatus and located partially under non-vertical solar shielding surfaces is a plurality of containers A through G and A' through G'. The containers have solar exposable surfaces 30 and are evenly divided into a first group A, B, C, D, E, F, and G and a second group A', B', C', D', E', F' and G'. A series of conduits AA through GG connect the containers A through G of the first group with A' through G' of the second group, AA connecting container A with A', BB connecting container B with B', etc. The containers hold a predetermined amount of a fluid (not shown) such as a freon.

The containers are supported by support means which comprise slidably mounted horizontal trays 32, upright brackets 34, beam 36 and fixed bracket 38. Upright brackets 34 are rigidly connected to trays 32 and are hingedly mounted to the ends of beam 36 as shown. Beam 36 is rotatably attached to fixed bracket 38 at its midpoint, rotational axis 40. Attached to the beam 36 at its rotational axis 40 may be an axle, such as axle 18 of FIG. 1, which may project outside the apparatus and be connected to an attachment which is desired to be moved.

Solar window 16 of FIG. 2 has an effective cross-sectional dimension perpendicular to the rotational axis 40 which is shown as S. This effective cross-sectional dimension is less than the greatest distance between the outer edges of the solar exposable surfaces 30, e.g., the distance from the left-most edge of container A to the right-most edge of container G'. By having a solar window which has an effective cross-sectional dimension perpendicular to the rotational axis of the support means which is less than the greatest distance between the outer edges of the solar exposable surfaces of the plurality of containers when measured perpendicular to the rotational axis of the support means, the apparatus functions based on the relative difference between the amount of solar energy on one group of the containers versus the other group and not merely on the change in exposure of only one side. The apparatus operates as follows:

As the sun rises in the east it initially shines only on containers in the western group (A through G) and boils off at least some of the liquid therefrom which passes through the conduits to the eastern group of containers (A' through G'). The excessive weight of the eastern containers causes its group to fall and the western group to rise so that axis of rotation 40 rapidly rotates in a clockwise manner so as to, for example, set a solar cell to face the sun. As the sun rises further toward noon, the sunlight as it passes through the solar window shifts to move and more of the solar exposable surfaces of the eastern group, although prior to high noon, still shining on more of the western group surfaces than the eastern group. This shifting of the sunlight causes a gradual return of the fluid from the eastern to the western group of containers so that by noon an attached device may be rotated so as to face straight up, i.e., face the sun, and by late afternoon to face the sun in the west. The apparatus results in a harmonious shifting or rotating of a device so as to be substantially solar oriented throughout most of the day, without the need for a power source external to the sun.

As an alternative to the arrangement shown in FIG. 2 wherein the trays 32 are mounted so as to remain essentially horizontal, the apparatus would operate effectively if the trays were attached directly to beam 36 and moved in a see-saw fashion as the weight of the fluid shifted during the operation of the apparatus.

What is claimed is:

1. A motor apparatus comprising:
   (a) a plurality of containers having solar exposable surfaces, the containers being evenly divided into a first group and a second group, each group having at least one container;
   (b) a conduit connecting at least one container of said first group with at least one container of said second group to form a closed system;
   (c) a predetermined amount of fluid in said closed system at least part of which is in the liquid phase;
   (d) support means for said containers, said support means having a rotational axis upon which at least part of said support means rotates in response to a shift in the amount of said fluid in said system which is distributed between said first group and said second group of containers forming said systems; and
   (e) a solar window-containing component comprising non-vertical solar shielding surfaces at least partially located above said plurality of containers, said surfaces having an open area forming a solar window above said plurality of containers, said window having an effective cross-sectional dimension perpendicular to the rotational axis of said support means which is less than the greatest distance between the outer edges of the solar exposable surfaces of said plurality of containers when measured perpendicular to the rotational axis of said support means, said window being located above said first and said second groups of containers.

2. The apparatus of claim 1 wherein said fluid is in the liquid and gaseous phases in at least one of the connected containers, said conduit is open for gaseous transport of said fluid between at least one container of the first group and at least one container of the second group, and the amount of fluid in said system which is distributed between said first group and said second group of containers forming said systems shifts by the boiling of said fluid from one group to the other in response to exposure of said solar exposable surfaces to solar energy.

3. The apparatus of claim 2 wherein said first and second groups of containers each have a plurality of containers positioned in a single plane and arranged in a series in a direction perpendicular to said rotational axis, the containers in each group being the first to the N-th containers when counted from left to right where N is the number of containers in each group, wherein the first container of one group is connected by a conduit to the first container in the other group and each of the remaining containers of one group are similarly connected by a conduit to the corresponding container in the other group to form a total of N closed systems.

4. The apparatus of claim 2 wherein said solar window-containing component is stationary and is not rotatable with said part of the support means which rotates.

5. The apparatus of claim 2 wherein said window contains a pane of glass which is magnifying glass.

6. The apparatus of claim 1 wherein said fluid is in both the liquid phase and the gaseous phase in each of said containers forming said system, said conduit connecting the first with the second group of containers extends into the containers into the fluid therein in the liquid phase, said conduit itself is filled with the liquid phase of said fluid, and the amount of fluid in said system which is distributed between said first group and said second group of containers forming said system shifts by changes in vapor pressure in the containers in response to exposure of said solar exposable surfaces to solar energy.

7. The apparatus of claim 6 wherein said first and second groups of containers each have a plurality of containers positioned in a single plane and arranged in a series in a direction perpendicular to said rotational axis, the containers in each group being the first to the N-th containers, when counted from left to right where N is the number of containers in each group, wherein the first container of one group is connected by a conduit to the first container in the other group and each of the remaining containers of one group are similarly connected by a conduit to the corresponding container in the other group to form a total of N closed systems.

8. The apparatus of claim 6 wherein said solar window-containing component is stationary and is not rotatable with said part of the support means which rotates.

9. The apparatus of claim 6 wherein said window contains a pane of glass which is magnifying glass.

* * * * *